(12) United States Patent
Canberk et al.

(10) Patent No.: US 10,789,749 B2
(45) Date of Patent: Sep. 29, 2020

(54) CONDITIONAL MODIFICATION OF AUGMENTED REALITY OBJECT

(71) Applicant: Snap Inc., Santa Monica, CA (US)

(72) Inventors: Ilteris Canberk, Venice, CA (US); Andrés Monroy-Hernández, Seattle, WA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/868,315

(22) Filed: May 6, 2020

(65) Prior Publication Data

US 2020/0265626 A1 Aug. 20, 2020

Related U.S. Application Data

(63) Continuation of application No. 16/043,995, filed on Jul. 24, 2018, now Pat. No. 10,679,393.

(51) Int. Cl.
*G06T 11/60* (2006.01)
*G06T 11/00* (2006.01)

(52) U.S. Cl.
CPC ............ *G06T 11/60* (2013.01); *G06T 11/001* (2013.01); *G06T 2200/24* (2013.01)

(58) Field of Classification Search
None
See application file for complete search history.

(56) References Cited

U.S. PATENT DOCUMENTS

| 666,223 A | 1/1901 | Shedlock |
|---|---|---|
| 4,581,634 A | 4/1986 | Williams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |

(Continued)

FOREIGN PATENT DOCUMENTS

| CA | 2887596 A1 | 7/2015 |
|---|---|---|
| EP | 2051480 A1 | 4/2009 |

(Continued)

OTHER PUBLICATIONS

U.S. Appl. No. 16/043,995, filed Jul. 24, 2018, Conditional Modification of Augmented Reality Object.

(Continued)

*Primary Examiner* — David H Chu
(74) *Attorney, Agent, or Firm* — Schwegman Lundberg & Woessner, P.A.

(57) ABSTRACT

A server machine modifies an augmented reality (AR) object in response to fulfillment of a condition. The machine provides, to a user device, object data that defines the AR object. The object data specifies a physical geolocation of the AR object, a presentation attribute of the AR object, a conditional modification program, and a trigger condition for execution of the conditional modification program. The object data causes the user device to present the AR object with a first appearance, located at the physical geolocation. The machine detects fulfillment of the trigger condition, and in response, the machine executes the conditional modification program. This modifies the object data by modifying the presentation attribute. The machine provides, to the user device, the modified object data, which causes the user device to present the AR object with a second appearance based on the modified presentation attribute.

20 Claims, 12 Drawing Sheets

(56) References Cited

U.S. PATENT DOCUMENTS

| | | |
|---|---|---|
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Ben-Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach, et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz et al. |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |

(56) References Cited

U.S. PATENT DOCUMENTS

| | | |
|---|---|---|
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root et al. |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,318,569 B1 | 6/2019 | Funk et al. |
| 10,679,393 B2 | 6/2020 | Canberk et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0056997 A1 | 3/2005 | Wakitani et al. |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |

(56) References Cited

U.S. PATENT DOCUMENTS

| | | |
|---|---|---|
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0187743 A1 | 8/2011 | Hwang et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0242134 A1 | 10/2011 | Miller et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0075285 A1 | 3/2012 | Oyagi et al. |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0218300 A1 | 8/2012 | Hayakawa |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |

(56) References Cited

U.S. PATENT DOCUMENTS

| | | |
|---|---|---|
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0100165 A1 | 4/2013 | Komiyama |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0147837 A1 | 6/2013 | Stroila |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0028712 A1 | 1/2014 | Keating et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055491 A1 | 2/2014 | Malamud et al. |
| 2014/0057660 A1 | 2/2014 | Wager |
| 2014/0063062 A1 | 3/2014 | Fateh |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125701 A1 | 5/2014 | Hayakawa |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0210859 A1 | 7/2014 | Ihara et al. |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0368542 A1 | 12/2014 | Tawara et al. |
| 2015/0006276 A1 | 1/2015 | Cohen |
| 2015/0020086 A1 | 1/2015 | Chen et al. |
| 2015/0029220 A1 | 1/2015 | Hittel et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0262197 A1 | 9/2015 | Chao et al. |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0004320 A1 | 1/2016 | Lundberg et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0093107 A1 | 3/2016 | Yamamoto et al. |
| 2016/0099901 A1 | 4/2016 | Allen et al. |
| 2016/0148430 A1 | 5/2016 | Lin et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0199855 A1 | 7/2017 | Fishbeck |
| 2017/0287006 A1 | 10/2017 | Azmoodeh et al. |
| 2018/0005443 A1 | 1/2018 | Poulos et al. |
| 2018/0114365 A1 | 4/2018 | Egri et al. |
| 2018/0136465 A1 | 5/2018 | Chi et al. |
| 2019/0011703 A1 | 1/2019 | Robaina et al. |
| 2019/0130436 A1 | 5/2019 | Ma et al. |
| 2020/0035003 A1 | 1/2020 | Canberk et al. |

FOREIGN PATENT DOCUMENTS

| | | | |
|---|---|---|---|
| EP | 2151797 | A1 | 2/2010 |
| GB | 2399928 | A | 9/2004 |

(56) References Cited

FOREIGN PATENT DOCUMENTS

| | | |
|---|---|---|
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | 2020023264 | 1/2020 |

OTHER PUBLICATIONS

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 16/043,995, Non Final Office Action dated Oct. 31, 2019", 9 pgs.

"U.S. Appl. No. 16/043,995, Notice of Allowance dated Feb. 7, 2020", 8 pgs.

"U.S. Appl. No. 16/043,995, Response filed Jan. 20, 2020 to Non Final Office Action dated Oct. 31, 2019", 12 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.beiuF_gFkg1hBM>, (Nov. 8, 2013), 113 pgs., 1:02 min.

"International Application Serial No. PCT/US2015/037251, International Search Report dated Sep. 29, 2015", 2 pgs.

"International Application Serial No. PCT/US2019/042183, International Search Report dated Oct. 30, 2019", 4 pgs.

"International Application Serial No. PCT/US2019/042183, Written Opinion dated Oct. 30, 2019", 5 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0zo&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWNQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvgOzjg10w>, (Feb. 6, 2012), 88 pgs. 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011109/08/mobli-filters>, (Sep. 8, 2011), 10 pgs.

Fuste, Anna, "HoloBits: Creativity and Fun in Mixed Reality", URL: https://www.media.mit.edu/projects/holobits/overview/, (accessed May 11, 2018), 4 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Placenote, "Introduction to Placenote SDK", URL: https://placenote.com/documentation/, (accessed May 17, 2018), 3 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Voropaev, Pavel, "AR Synchronization System by Prisma", URL: https://blog.prismalabs.ai/ar-synchronization-system-by-prisma-3c41ff55a2a7, (accessed May 11, 2018), 6 pgs.

CONDITIONAL MODIFICATION OF AUGMENTED REALITY OBJECT

CLAIM OF PRIORITY

This application is a continuation of U.S. patent application Ser. No. 16/043,995, filed on Jul. 24, 2018, which is incorporated herein by reference in its entirety.

TECHNICAL FIELD

The subject matter disclosed herein generally relates to the technical field of special-purpose machines that facilitate generation and presentation of computer graphics, including software-configured computerized variants of such special-purpose machines and improvements to such variants, and to the technologies by which such special-purpose machines become improved compared to other special-purpose machines that facilitate generation and presentation of computer graphics. Specifically, the present disclosure addresses systems and methods to facilitate presentation of an augmented reality (AR) object.

BACKGROUND

A machine (e.g., a user's device) may be configured to interact with one or more users by generating computer graphics and causing presentation thereof in an AR environment or a virtual reality (VR) environment. For example, a user's device in the example form of a smartphone may generate AR content (e.g., one or more AR objects) and cause the AR content to be displayed to the user (e.g., on a display screen of the smartphone or a head-mounted display (HMD) controlled by the smart phone).

BRIEF DESCRIPTION OF THE DRAWINGS

Some embodiments are illustrated by way of example and not limitation in the figures of the accompanying drawings.

DETAILED DESCRIPTION

Figure 1:
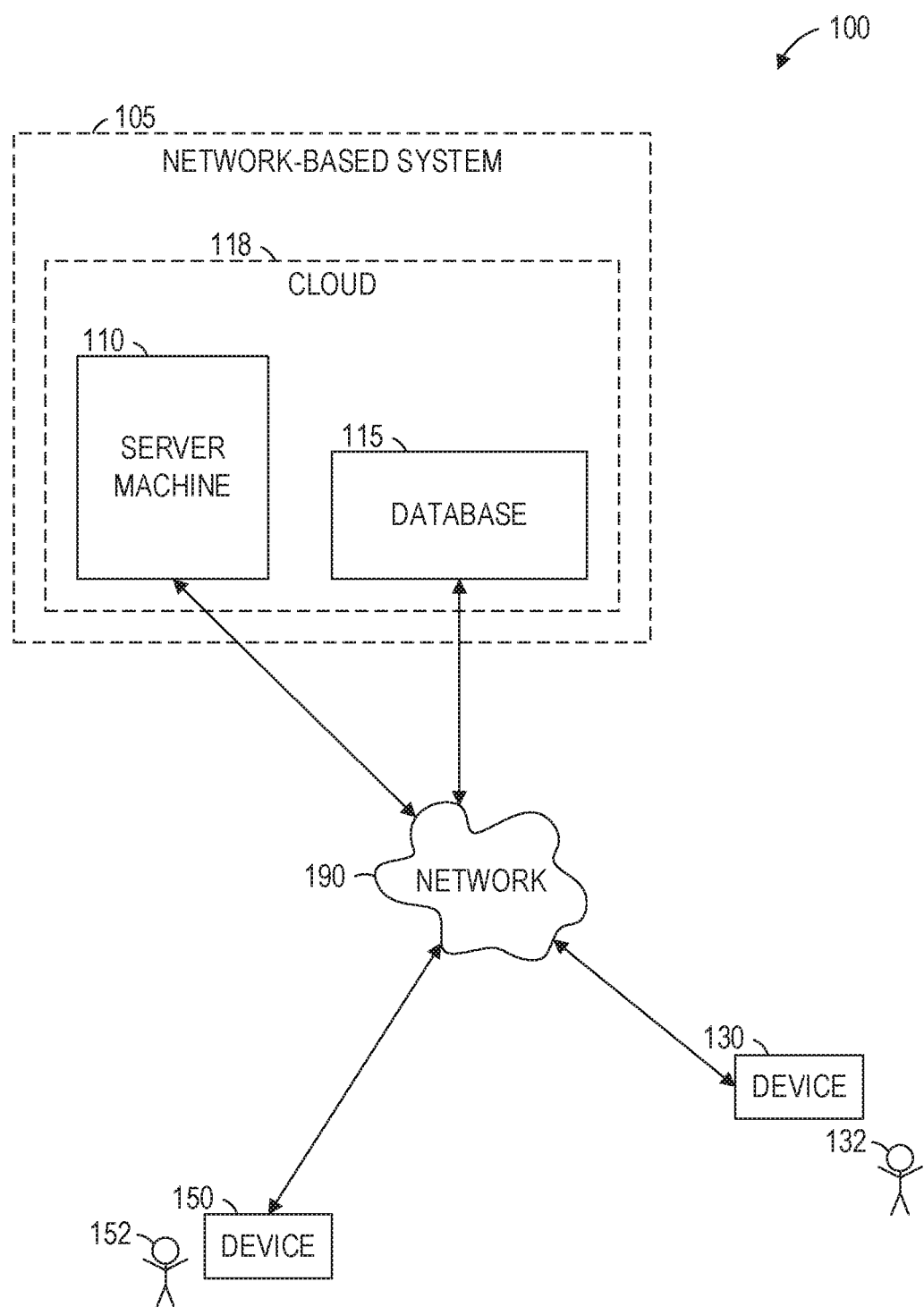
FIG. 1 is a network diagram illustrating a network environment suitable for facilitating conditional modification of an AR object, according to some example embodiments.

Example methods (e.g., algorithms) facilitate conditional modification of one or more AR objects, and example systems (e.g., special-purpose machines configured by special-purpose software) are configured to facilitate conditional modification of one or more AR objects. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server machine) is configured (e.g., by suitable software, hardware, or both) to provide a consistent set of one or more AR objects to one or more user devices (e.g., one or more smartphones, game controllers, HMDs, or combinations thereof), and the machine is configured to modify one or more of these AR objects in response to detected fulfillment of one or more conditions. For clarity and brevity, the discussion herein focuses on conditional modification of a single AR object, presented with an appearance of being present in the real world, though the example systems and methods discussed herein are applicable to conditional modification of multiple AR objects similarly presented.

Configured in accordance with the systems and methods discussed herein, the machine provides, to a user device, object data that defines an AR object. The object data of the AR object, in some example embodiments, specifies four things: (1) a physical geolocation of the AR object, (2) a presentation attribute of the AR object, (3) a conditional modification program of the AR object, and (4) a trigger condition for execution of the conditional modification program. The provided object data causes the user device, as well as any number of other user devices in the area, to present the AR object with a consistent first appearance and consistently located at the physical geolocation. The machine then detects fulfillment of the trigger condition specified by the object data, and based on the detected fulfillment of the trigger condition, the machine executes the conditional modification program of the AR object. The executing of the conditional modification program modifies the object data of the AR object by modifying the presentation attribute of the AR object. The machine next provides, to the user device, as well as any other user devices present, the modified object data of the AR object. The modified object data causes the user device, as well as any other user device in the area, to present the AR object with a consistent second appearance that is based on the modified presentation attribute of the AR object.

By causing the AR object to change from its first appearance to its second appearance, in accordance with the methodologies described herein, the machine provides interactivity between the AR object and one or more users. For example, the detected trigger condition may be or include a user or her device intersecting the AR object, and in response to this intersection, the AR object may change color (e.g., from gray to blue, darker hue to lighter hue, or both) and emit animated sparkles. As another example, the detected trigger condition may be or include an increase in ambient audio loudness, and in response to this increase, the AR object may change color and begin pulsating or flashing. As yet another example, the detected trigger condition may be or include a pattern of sound (e.g., a candidate pattern that matches a reference pattern, which may represent clapping, stomping, or chanting), and in response to this pattern of sound, the AR object may change size (e.g., appear to inflate).

As a further example, the detected trigger condition may be or include a user's device selecting the AR object for editing, and in response to this selection, the AR object may be displayed with a cursor or other visual highlight that indicates which portion of the AR object is ready to be edited. This may have the effect of assisting the user in planning or making an edit to the AR object. As a still further example, the detected trigger condition may be or include an interaction count transgressing a threshold value (e.g., a minimum or maximum interaction count), and in response to this transgression, the AR object may bounce vertically in space and emit animated fireworks. This may have the effect of indicating the attaining of a milestone in the AR object's user interactivity. As a yet further example, the detected trigger condition may be or include an interaction time transgressing a threshold value (e.g., minimum or maximum interaction time), and in response to this transgression, the AR object may change its size, its physical geolocation in the real world, or both. This may have the effect of altering the attractiveness or availability of the AR object for further interactions with users.

According to various example embodiments, the conditional modification program may be provided by the machine (e.g., as part of generating the object data of the AR object) or provided by a user's device (e.g., as an edit to the object data the AR object). In general, the object data of the AR object may contain one or more user-provided conditional modification programs, which may be a subset of all conditional modification programs specified for the AR object. In some example embodiments, a user-provided conditional modification program is incorporated by the machine into the object data for a specified period of time (e.g., in exchange for a fee payment or a task performance from the user's device). After the specified time period is over, the machine may remove the user-provided conditional modification program, prompt the user to renew the conditional modification program for an additional period of time, or both.

FIG. 1 is a network diagram illustrating a network environment 100 suitable for conditional modification of an AR object, according to some example embodiments. The network environment 100 includes a server machine 110, a database 115, and devices 130 and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services, such as AR services, to the devices 130 and 150). The server machine 110, the database 115, and the devices 130 and 150 may each be implemented in a special-purpose (e.g., specialized) computer system, in whole or in part, as described below with respect to FIG. 10.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smartphone (e.g., with a touchscreen configured to detect one or more touch gestures), or a wearable device (e.g., an HMD, such as an AR headset, a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smartphone (e.g., with a touchscreen configured to detect one or more touch gestures), or a wearable device (e.g., an HMD, such as an AR headset, a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
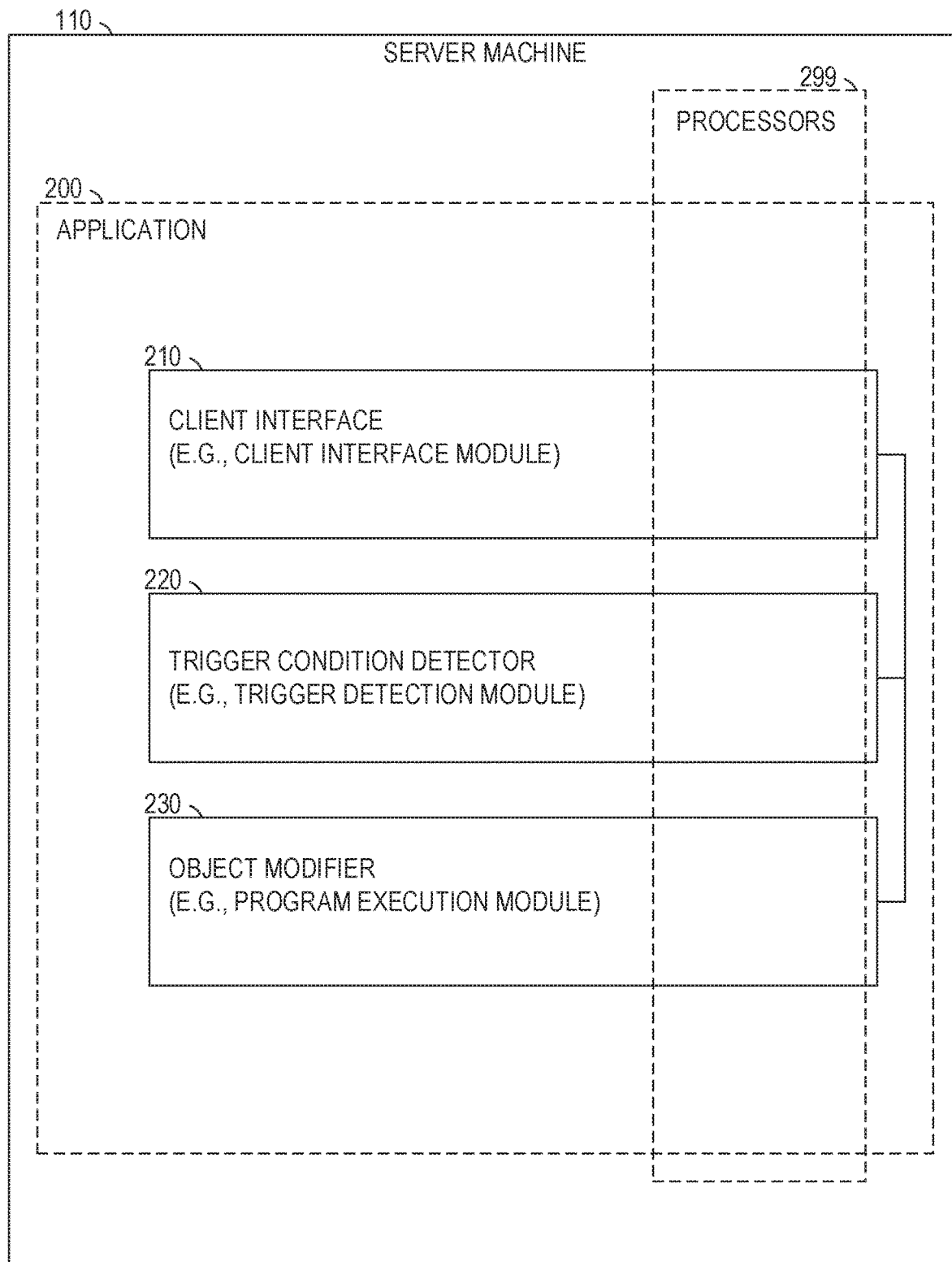
FIG. 2 is a block diagram illustrating components of a server machine suitable for facilitating conditional modification of an AR object, according to some example embodiments.

FIG. 2 is a block diagram illustrating components of the server machine 110, according to some example embodiments. The server machine 110 is shown as including a client interface 210, a trigger condition detector 220, and an object modifier 230, all configured to communicate with each other (e.g., via a bus, shared memory, or a switch). The client interface 210 may be or include a client interface module or similarly suitable software code configured to interface with one or more clients of the server machine 110 (e.g., one or more of the devices 130 and 150). The trigger condition detector 220 may be or include a trigger detection module or similarly suitable software code configured to detect one or more trigger conditions (e.g., a trigger condition for execution of a conditional modification program for an AR object). The object modifier 230 may be or include a program execution module or similarly suitable software code configured to execute a program (e.g., a conditional modification program for an AR object).

As shown in FIG. 2, the client interface 210, the trigger condition detector 220, the object modifier 230, or any suitable combination thereof, may form all or part of an application 200 (e.g., a server-side app or other server-executed program) that is stored (e.g., installed) on the server machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the application 200, the client interface 210, the trigger condition detector 220, the object modifier 230, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
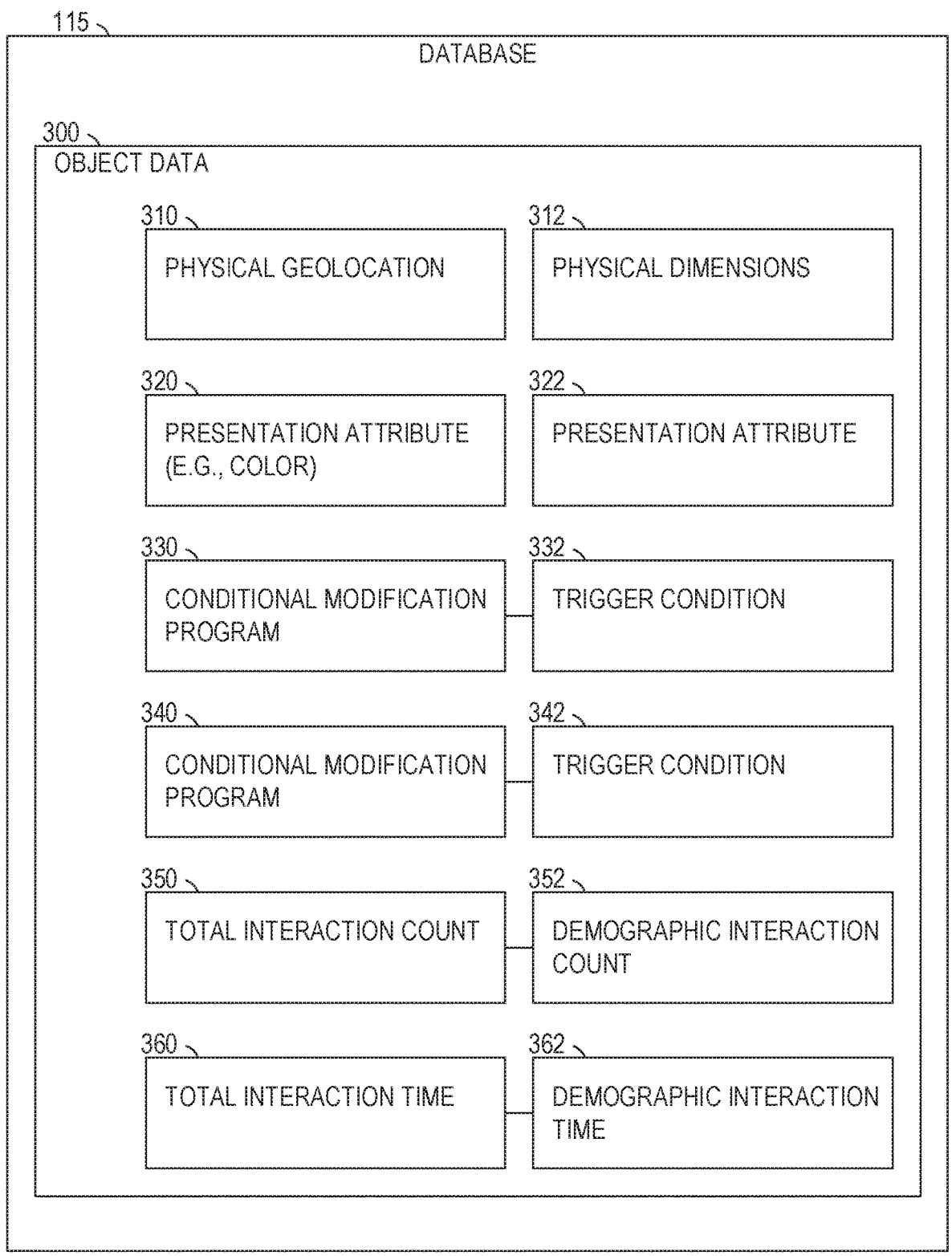
FIG. 3 is a block diagram illustrating components of a database suitable for facilitating conditional modification of an AR object, according to some example embodiments.

FIG. 3 is a block diagram illustrating components of the database 115, according to some example embodiments. The database 115 is shown as storing object data 300 of an AR object. The object data 300 corresponds to the AR object, defines the AR object, and specifies how the AR object is to be presented (e.g., visually, acoustically, or both) in an AR environment. Accordingly, one or more portions of the object data 300 may be considered as metadata of the AR object to which the object data 300 corresponds.

As shown in FIG. 3, the object data 300 specifies (e.g., by inclusion or by reference) one or more of various characteristics or other descriptors of the AR object. For example, the object data 300 is shown as specifying (e.g., by inclusion) a physical geolocation 310 of the AR object in the real world. In some example embodiments, the physical geolocation 310 is specified by global geolocation coordinates relative to the earth (e.g., a triplet of latitude, longitude, and altitude). In other example embodiments, the physical geolocation 310 is specified by relative geolocation coordinates relative to a room, a building, a landmark, or other suitable frame of reference. In some example embodiments, the physical geolocation 310 is treated as a type of presentation attribute for presenting the AR object.

The object data 300 may specify physical dimensions 312 of the AR object in the real world. The physical dimensions 312 may fully or partially define the size of the AR object, the shape of the AR object, the orientation of the AR object, or any suitable combination thereof. For example, the physical dimensions 312 may specify one or more linear dimensions (e.g., length, width, and height) of the AR object. In some example embodiments, the physical dimensions 312 are treated as presentation attributes for presenting the AR object.

The object data 300 may specify one or more presentation attributes 320 and 322 (e.g., additional presentation attributes beyond the physical geolocation 310 and the physical dimensions 312) of the AR object. A presentation attribute specifies how the AR object is to be presented (e.g., visually, acoustically, haptically, or any suitable combination thereof). Examples of a presentation attribute include a color of the AR object, a color pattern (e.g., chroma texture map) applied to the AR object, a brightness of the AR object, a brightness pattern (e.g., a luma texture map) applied to the AR object, a flash indicator of the AR object (e.g., to indicate whether the AR object should be displayed in a flashing state), a movement indicator of the AR object (e.g., to indicate whether the AR object should be displayed in a vertically bouncing state, horizontally jiggling state, or both), an audio file of the AR object (e.g., to be played when one or more users is physically within a threshold distance of the physical geolocation 310 of the AR object), an audio volume of the AR object (e.g., to provide a basis for audio playback of the audio file of the AR object), or any suitable combination thereof.

The object data 300 may specify one or more pairs of conditional modification programs of the AR object, each with one or more corresponding trigger conditions for execution of that conditional modification program. FIG. 3 illustrates a conditional modification program 330 paired with a corresponding trigger condition 332, as well as another conditional modification program 340 paired with a corresponding trigger condition 342. Accordingly, if the trigger condition detector 220 (e.g., in the server machine 110) detects fulfillment of the trigger condition 332, the corresponding conditional modification program 330 is executed (e.g., by the object modifier 230 in the server machine 110). Similarly, if the trigger condition detector 220 detects fulfillment of the trigger condition 342, the corresponding conditional modification program 340 is executed.

According to some example embodiments, the object data 300 specifies a total interaction count 350, which may quantify (e.g., by enumerating) a total number of discrete user interactions experienced by the AR object. The total interaction count 350 may be paired with one or more corresponding demographic interaction counts. FIG. 3 illustrates the total interaction count 350 paired with a single corresponding demographic interaction count 352, though additional corresponding demographic interaction counts may also be included in the object data 300 and associated with (e.g., linked, mapped, or otherwise assigned to) the total interaction count 350. The demographic interaction count 352 may quantify a total number of discrete user interactions experienced by the AR object with users from a particular demographic group (e.g., defined by age, gender, education, occupation, favorite ice cream flavor, any other demographic descriptor, or any suitable combination thereof).

According to certain example embodiments, the object data 300 specifies a total interaction time 360, which may quantify (e.g., by valuing) a total amount of time during which the AR object experienced user interactions. The total interaction time 360 may be paired with one more corresponding demographic interaction times. FIG. 3 illustrates the total interaction time 360 being paired with a single corresponding demographic interaction time 362, though additional corresponding demographic interaction times may also be included in the object data 300 and associated with (e.g., linked, mapped, or otherwise assigned to) the total interaction time 360. The demographic interaction time 362 may quantify a total amount of time during which the object experienced user interactions with users from a particular demographic group (e.g., defined by age, gender, education, occupation, favorite ice cream flavor, any other demographic descriptor, or any suitable combination thereof).

Figure 4:
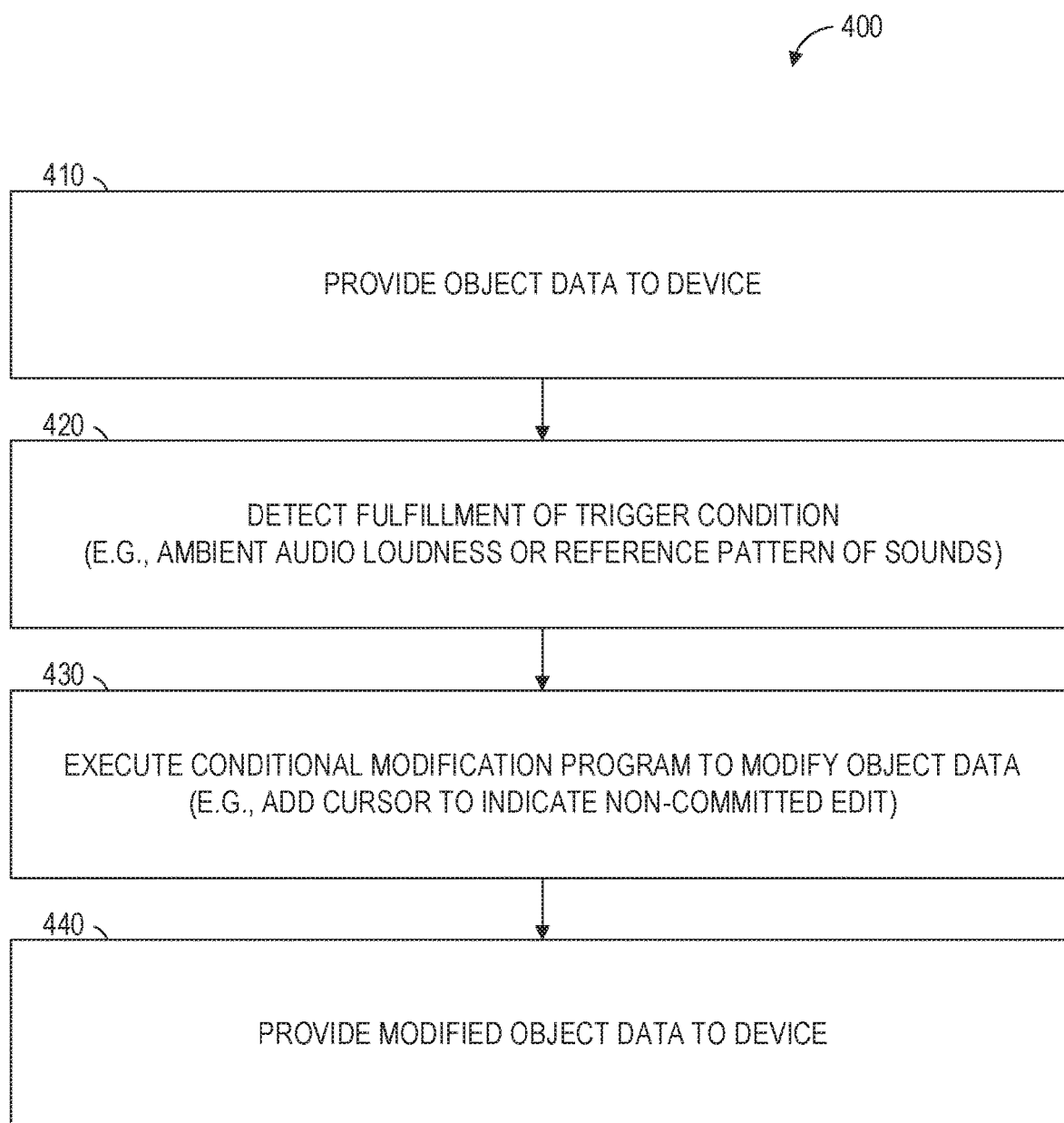
FIGS. 4-9 are flowcharts illustrating operations of the server machine in performing a method of conditionally modifying of an AR object, according to some example embodiments.

FIGS. 4-9 are flowcharts illustrating operations in performing a method 400 of conditionally modifying of an AR object, according to some example embodiments. For clarity and brevity, operations in the method 400 are presently described as being performed by the server machine 110, using components (e.g., modules) described above with respect to FIG. 2, using one or more processors (e.g., microprocessors or other hardware processors), or using any suitable combination thereof. However, in various example embodiments, the method 400 may be performed by the device 130, alone or in conjunction with one or more other machines (e.g., the server machine 110, the database 115, or the device 150). As shown in FIG. 4, the method 400 includes operations 410, 420, 430, and 440.

In operation 410, the client interface 210 provides the object data 300 to the device 130. For example, the client interface 210 may retrieve the object data 300 from the database 115 and provide the object data 300 to the device 130 via the network 190. As another example, the client interface 210 may command or otherwise cause the database 115 to provide the object data 300 to the device 130. As noted above, the object data 300 corresponds to an AR object and specifies, for example, the physical geolocation 310, the presentation attribute 320 (e.g., color or size), the conditional modification program 330, and the corresponding trigger condition 332. The object data 300 causes the device 130 to present (e.g., via a display screen or an AR headset) the AR object defined by the object data 300. In accordance with the provided object data 300, the device 130 presents the AR object at the physical geolocation 310 and with a first appearance (e.g., visual appearance, acoustic appearance, or both) specified by the object data 300 (e.g., specified by the presentation attribute 320).

In operation 420, the trigger condition detector 220 detects that the trigger condition 332 has been fulfilled. This may be performed by receiving an indicator or other signal from the client interface 210 (e.g., as a result of a status message being received by the client interface 210 via the network 190 from the device 130). As noted above, the trigger condition 332 corresponds to the conditional modification program 330, and the object data 300 of the AR object specifies that the trigger condition 332 is a trigger for executing the corresponding conditional modification program 330 to modify the AR object.

To illustrate an example, suppose that the trigger condition 332 for executing the conditional modification program 330 specifies reception of an indication that a portion of the AR object is being edited. In this situation, the detecting in operation 420 that the trigger condition 332 has been fulfilled may include receiving such an indication (e.g., from the device 130 via the network 190) that a portion of the AR object is being edited.

To illustrate another example, suppose that the trigger condition 332 for executing the conditional modification program 330 specifies a threshold level (e.g., a reference threshold level) of ambient audio loudness. In such a situation, the detecting in operation 420 that the trigger condition 332 has been fulfilled may include receiving an indication that a microphone of the device 130 has detected an actual level of ambient audio loudness that transgresses (e.g., meets or exceeds) the threshold level of ambient audio loudness.

To illustrate a further example, suppose that the trigger condition 332 specifies a reference pattern of sounds (e.g., clapping or a song, such as "The Star-Spangled Banner"). In such a situation, the detecting in operation 420 that the trigger condition 332 has been fulfilled may include receiving an indication that the microphone of the device 130 has captured an actual pattern of sounds that matches the reference pattern of sounds.

In operation 430, the object modifier 230 executes the conditional modification program 330 that corresponds to the trigger condition 332 that was detected to be fulfilled in operation 420. This is performed in response to the detected fulfillment of the trigger condition 332. Accordingly, the execution of the conditional modification program 330 modifies the object data 300 of the AR object and consequently modifies the AR object. For example, execution of the conditional modification program 330 may modify the object data 300 by modifying the presentation attribute 320 (e.g., color or size) within the object data 300. The modification of the object data 300 may occur within the database 115, within the server machine 110 (e.g., within a memory of the server machine 110), or within any suitable combination thereof.

To illustrate an example, suppose that that the trigger condition 332 for executing the conditional modification program 330 specifies reception of an indication that a portion of the AR object is being edited. In this situation, in response to a detection in operation 420 that the trigger condition 332 has been fulfilled, the executing of the conditional modification program 330 may add an AR cursor to the AR object in its second appearance, and the added AR cursor may indicate that the portion of the AR object is being edited. For example, the AR cursor may indicate a location of a non-committed edit to the AR object (e.g., an edit that is not yet saved or otherwise persistently incorporated into the object data 300 of the AR object).

In operation 440, the client interface 210 provides at least the modified portion of the object data 300 to the device 130.

For example, the entirety of the modified object data 300 may be communicated to the device 130 via the network 190, or the modified presentation attribute 320 (e.g., size or color of the AR object) may be communicated to the device 130 via the network 190. In some example embodiments, the modified object data 300 is stored in the database 115, and the client interface 210 commands or otherwise causes the device 130 to retrieve at least the modified portion (e.g., the modified presentation attribute 320) of the object data 300 via the network 190. The modified object data 300 causes the device 130 to present (e.g., via a display screen or an AR headset) the AR object in modified form, as modified in accordance with a modified object data 300. Thus, in accordance with the modified object data 300, the device 130 presents the AR object with a second appearance specified by the modified object data 300 (e.g., specified by the modified presentation attribute 320).

For example, the presentation attribute modified in operation 430 (e.g., presentation attribute 320 or physical dimensions 312) may specify a physical dimension (e.g., length, width, height, depth, thickness, or any suitable combination thereof) of the AR object, and that physical dimension may fully or partially determine the real-world size of the AR object. Accordingly, the executing of the conditional modification program 330 in operation 430 may modify this physical dimension of the AR object and consequently alter the real-world size of the AR object, as presented with its second appearance.

As another example, the presentation attribute modified in operation 430 (e.g., presentation attribute 320) may specify a color (e.g., hue, saturation, brightness, or any suitable combination thereof) of at least a portion of the AR object. Accordingly, the executing of the conditional modification program 330 in operation 430 may modify this color of the AR object and consequently alter the color of at least a portion of the AR object, as presented with its second appearance.

As a further example, the presentation attribute modified in operation 430 (e.g., presentation attribute 320 or physical geolocation 310) may specify the physical geolocation of the AR object in the real world, and that physical geolocation may fully or partially determine the real-world geolocation of the AR object. Accordingly, the executing of the conditional modification program 330 in operation 430 may modify this real-world geolocation of the AR object and consequently alter where the AR object is presented relative to the real world, in accordance with its second appearance.

Figure 5:
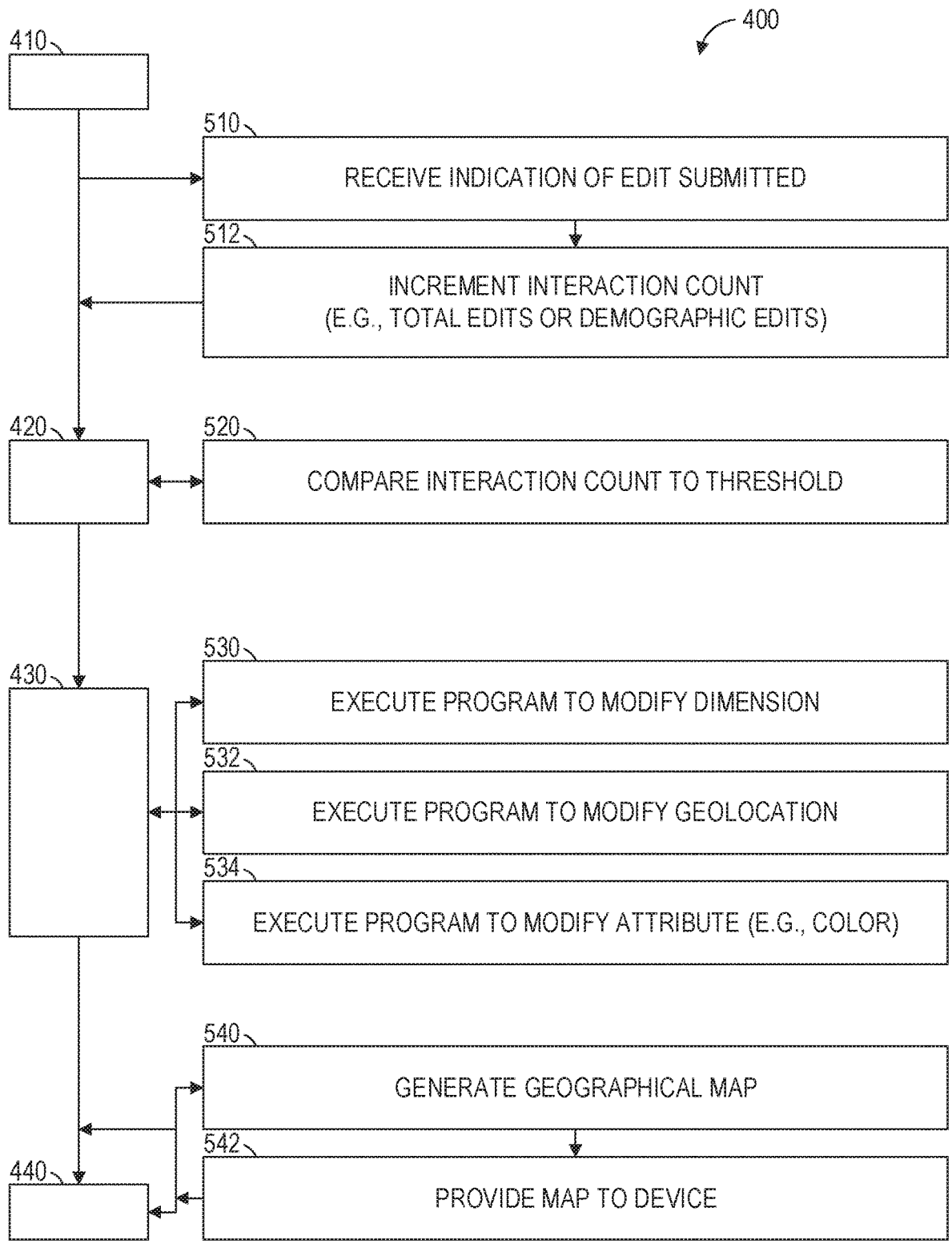

As shown in FIG. 5, in addition to any one or more of the operations previously described, the method 400 may include one or more of operations 510, 512, 520, 530, 532, 534, 540, and 542. According to some example embodiments, operations 510 and in 512 are performed prior to operation 420, in which the trigger condition detector 220 detects fulfillment of the trigger condition 332.

In operation 510, the client interface 210 receives an indication that the device 130 submitted an edit to the AR object (e.g., an edit in the form of a newly added portion, removal of an existing portion, or modification to an existing portion of the AR object). For example, the client interface 210 may receive a request that an edit be performed on the AR object (e.g., stored in the object data 300 or otherwise persistently incorporated into the definition of the AR object), and such a request may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., single women between ages 25 and 40 whose favorite ice cream flavor is chocolate).

In operation 512, the client interface 210 increments an interaction count that corresponds to the AR object (e.g., the total interaction count 350, the demographic interaction count 352, or both), in response to the indication received in operation 510. For example, the client interface 210 may increment the total interaction count 350 that corresponds to the AR object. As another example, if the received indication in operation 510 indicates that the user 132 is a member of a particular demographic group (e.g., single women between 25 and 40 whose favorite ice cream flavor is chocolate), the demographic interaction count for that particular demographic group (e.g., demographic interaction count 352) may be incremented by the client interface 210. In such a situation, the total interaction count 350 may also be incremented as well (e.g., to tally user interactions of multiple kinds, from multiple demographic groups, or both).

In example embodiments that include operation 512, operation 520 may be performed as part (e.g., a precursor task, a subroutine, or a portion) of operation 420, in which the trigger condition detector 220 detects fulfillment of the trigger condition 332. In operation 520, the trigger condition detector 220 performs a comparison of the interaction count (e.g., the total interaction count 350 or the demographic interaction count 352) incremented in operation 512 to a corresponding threshold interaction count (e.g., a predetermined total interaction count or a predetermined demographic interaction count, either of which may be a maximum interaction count or a minimum interaction count).

Accordingly, the detection of the fulfillment of the trigger condition 332 in operation 420 may be based on the comparison performed in operation 520. For example, if the total interaction count 350 was incremented in operation 512, the trigger condition detector 220 may compare the total interaction count 350 to a reference total interaction count (e.g., a maximum interaction count of all types and from all users). As another example, if the demographic interaction count 352 was incremented in operation 512, the trigger condition detector 220 may compare the demographic interaction count 352 to a reference demographic interaction count (e.g., a maximum interaction count or a minimum interaction count for that demographic group).

As shown in FIG. 5, one or more of operations 530, 532, and 534 may be performed as part of operation 430, in which the object modifier 230 executes the conditional modification program 330 to modify the object data 300 of the AR object. In operation 530, the object modifier 230 modifies a physical dimension (e.g., as specified by the presentation attribute 320 or the physical dimensions 312) of the AR object by executing the conditional modification program 330. As noted above, this may have the effect of altering the real-world size of the AR object, as presented with its second appearance.

In operation 532, the object modifier 230 modifies the physical geolocation (e.g., specified by the presentation attribute 320 or the physical geolocation 310) of the AR object by executing the conditional modification program 330. As noted above, this may have the effect of altering where the AR object is presented relative to the real world, according to its second appearance.

In operation 534, the object modifier 230 modifies a presentation attribute (e.g., specified by the presentation attribute 320, which may, for example, specify color) of the AR object by executing the conditional modification program 330. As noted above, this may have the effect of altering the appearance of the AR object from its first appearance to its second appearance.

As shown in FIG. 5, one or more of operations 540 and 542 may be performed after operation 430, in which the object modifier 230 executes the conditional modification program 330 to modify the object data 300 of the AR object. In operation 540, the client interface 210 generates a geographical map (e.g., a map that illustrates roads and landmarks within a geographical area, such as a city). The geographical map includes a depiction or other representation (e.g., symbolic representation) of the AR object and indicates the physical geolocation 310 of the AR object. In addition, the depiction or other representation may have a color that indicates a frequency (e.g., averaging five times a day, twice a week, or once a month) or range of frequencies at which the AR object is edited (e.g., by user interactions). For example, a gray depiction may indicate that the AR object is edited by users less than once a week, while a blue depiction may indicate that the AR object is edited by users more than once a week.

In operation 542, the client interface 210 provides the geographical map generated in operation 540 to one or more devices. For example, the geographical map may be provided to the device 150 (e.g., as a guide for the user 152 to locate the AR object for further interaction, such as editing). Accordingly, the color of the depiction of the AR object within the provided geographical map can notify the user 152 of how often the AR object is edited.

Figure 6:
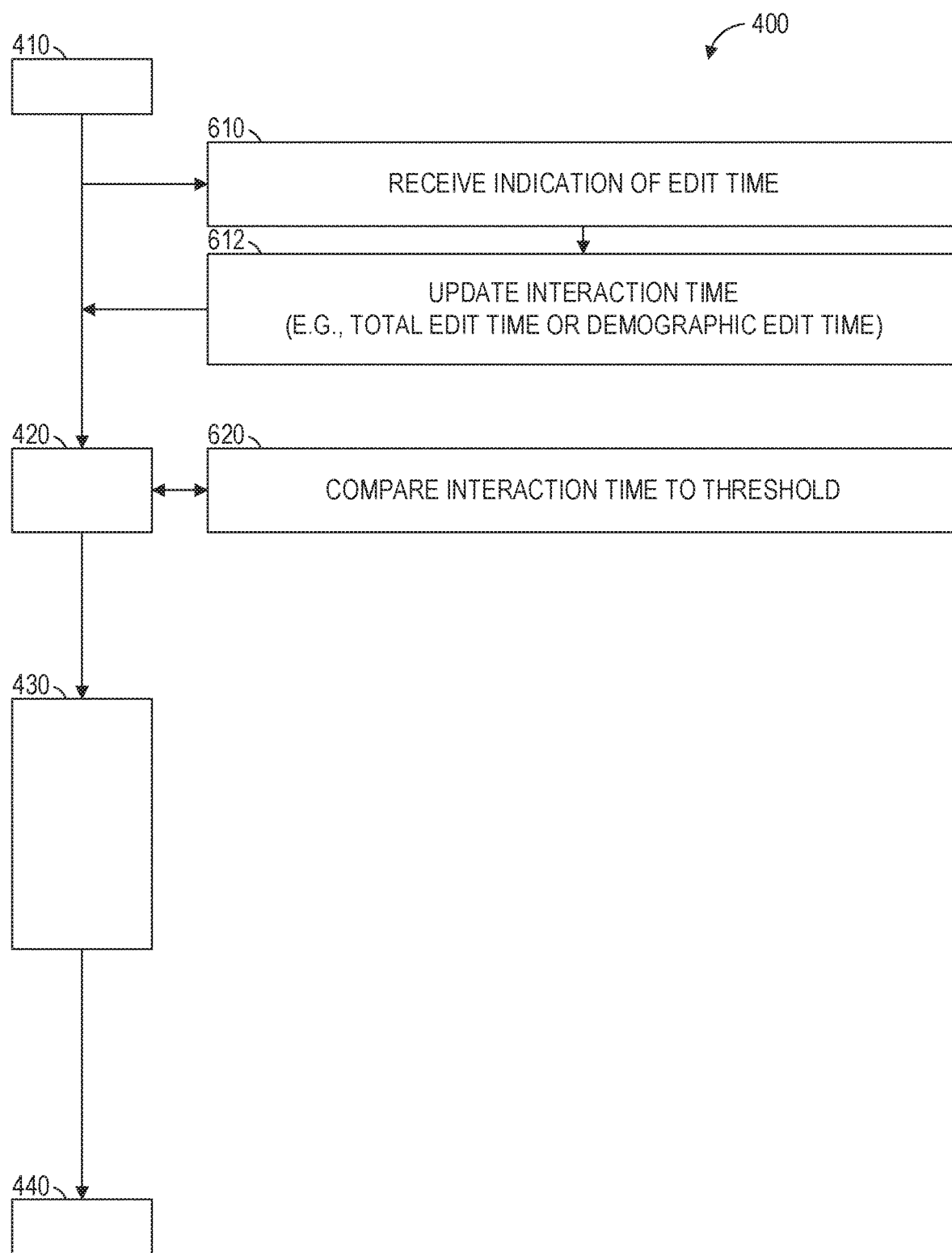

As shown in FIG. 6, in addition to any one or more of the operations previously described, the method 400 may include one or more of operations 610, 612, and 620. According to some example embodiments, operation 610 and 612 are performed prior to operation 420, in which the trigger condition detector 220 detects fulfillment of the trigger condition 332.

In operation 610, the client interface 210 receives an indication that the device 130 has been editing the AR object or has edited the AR object for a period of time (e.g., a period of time during which the AR object has been kept in an editing state or other edit-accepting state). For example, the client interface 210 may receive a request that the AR object be unlocked for editing (e.g., with write-permissions for the object data 300 that defines the AR object), and such a request may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., married men between ages 40 and 55 whose favorite ice cream flavor is vanilla).

In operation 612, the client interface 210 updates an interaction time that corresponds to the AR object (e.g., the total interaction time 360, the demographic interaction time 362, or both), in response to the indication received in operation 610. For example, the client interface 210 may update the total interaction time 360 that corresponds to the AR object. As another example, if the received indication in operation 610 indicates that the user 132 is a member of a particular demographic group (e.g., married men between 40 and 55 whose favorite ice cream flavor is vanilla), the demographic interaction time for that particular demographic group (e.g., demographic interaction time 362) may be updated by the client interface 210. In such a situation, the total interaction time 360 may also be incremented as well (e.g., to track cumulative user interaction times from multiple demographic groups).

In example embodiments that include operation 612, operation 620 may be performed as part of operation 420, in which the trigger condition detector 220 detects fulfillment of the trigger condition 332. In operation 620, the trigger condition detector 220 performs a comparison of the interaction time (e.g., the total interaction time 360 or the demographic interaction time 362) updated in operation 512 to a corresponding threshold interaction time (e.g., a predetermined total interaction time or a predetermined demographic interaction time, either of which may be a maximum interaction time or a minimum interaction time).

Accordingly, the detection of the fulfillment of the trigger condition 332 in operation 420 may be based on the comparison performed in operation 620. For example, if the total interaction time 360 was updated in operation 612, the trigger condition detector 220 may compare the total interaction time 360 to a reference total interaction time (e.g., a maximum interaction time for all users). As another example, if the demographic interaction time 362 was updated in operation 612, the trigger condition detector 220 may compare the demographic interaction time 362 to a reference demographic interaction time (e.g., a maximum interaction time or a minimum interaction time for that demographic group).

Figure 7:
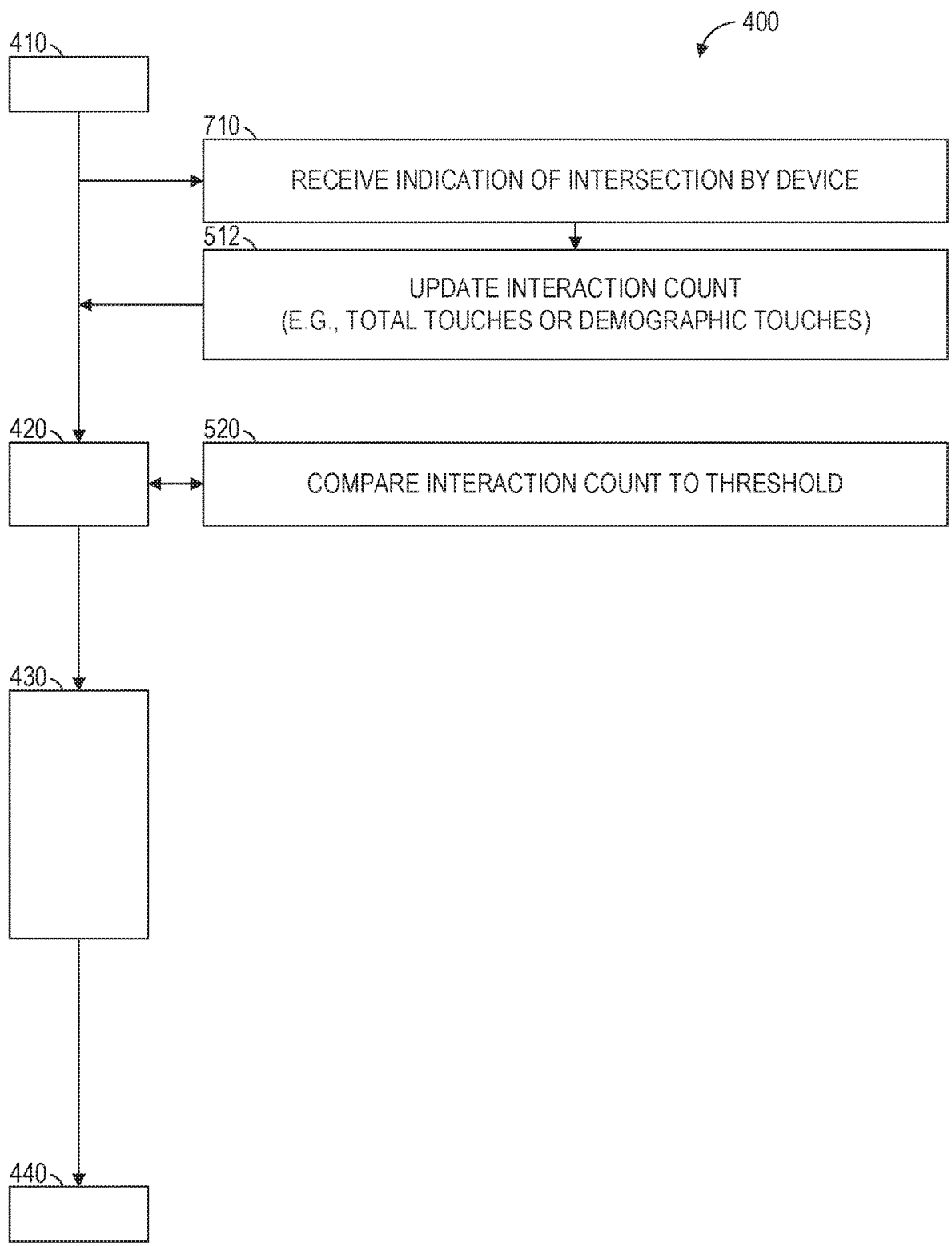

As shown in FIG. 7, in addition to any one or more of the operations previously described, the method 400 may include one or more of operations 710, 512, and 520, the latter two of which have been previously described. According to some example embodiments, operations 710 and in 512 are performed prior to operation 420, in which the trigger condition detector 220 detects fulfillment of the trigger condition 332.

In operation 710, the client interface 210 receives an indication that the device 130 has intersected the AR object (e.g., an indication that the geolocation of the device 130 has coincided with the physical geolocation 310 of the AR object or has been encompassed by an outer surface of the AR object, as defined by the physical dimensions 312 of the AR object). For example, the client interface 210 may receive such an indication in the form of geolocation data of the device 130, which geolocation data may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., married women between ages 55 and 70 whose favorite ice cream flavor is coffee).

As noted above, in operation 512, the client interface 210 increments an interaction count that corresponds to the AR object (e.g., the total interaction count 350, the demographic interaction count 352, or both). This may be performed in response to the indication received in operation 710. For example, the client interface 210 may increment the total interaction count 350 that corresponds to the AR object. As another example, if the received indication in operation 710 indicates that the user 132 is a member of a particular demographic group (e.g., married women between 55 and 70 whose favorite ice cream flavor is coffee), the demographic interaction count for that particular demographic group (e.g., demographic interaction count 352) may be incremented by the client interface 210. In such a situation, the total interaction count 350 may also be incremented as well (e.g., to tally user interactions of multiple kinds, from multiple demographic groups, or both).

As noted above, in example embodiments that include operation 512, operation 520 may be performed as part (e.g., a precursor task, a subroutine, or a portion) of operation 420, in which the trigger condition detector 220 detects fulfillment of the trigger condition 332. In operation 520, the trigger condition detector 220 performs a comparison of the interaction count (e.g., the total interaction count 350 or the demographic interaction count 352) incremented in operation 512 to a corresponding threshold interaction count (e.g., a predetermined total interaction count or a predetermined demographic interaction count, either of which may be a maximum interaction count or a minimum interaction count).

Accordingly, the detection of the fulfillment of the trigger condition 332 in operation 420 may be based on the comparison performed in operation 520. For example, if the total interaction count 350 was incremented in operation 512, the trigger condition detector 220 may compare the total interaction count 350 to a reference total interaction count (e.g., a maximum interaction count of all types and from all users). As another example, if the demographic interaction count 352 was incremented in operation 512, the trigger condition detector 220 may compare the demographic interaction count 352 to a reference demographic interaction count (e.g., a maximum interaction count or a minimum interaction count for that demographic group).

Figure 8:
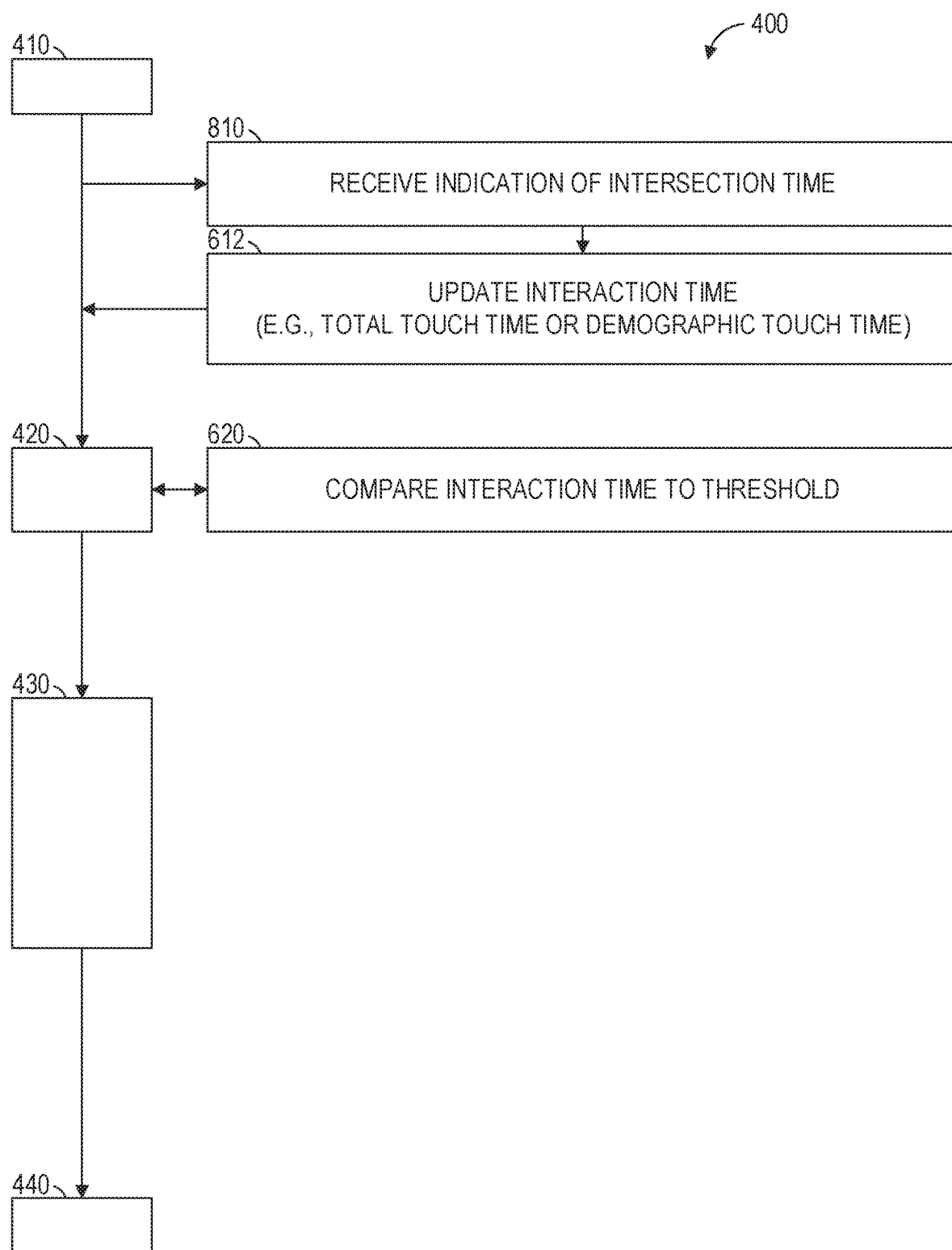

As shown in FIG. 8, in addition to any one or more of the operations previously described, the method 400 may include one or more of operations 810, 612, and 620, the latter two of which have been previously described. According to some example embodiments, operation 810 and 612 are performed prior to operation 420, in which the trigger condition detector 220 detects fulfillment of the trigger condition 332.

In operation 810, the client interface 210 receives an indication that the device 130 has been intersecting the AR object or has intersected the AR object for a period of time (e.g., a period of time during which the geolocation of the device 130 has coincided with the physical geolocation 310 of the AR object or has been encompassed by an outer surface of the AR object, as defined by the physical dimensions 312 of the AR object). For example, the client interface 210 may receive a status message indicating a running tally of intersection time, and such a status message may be received by the network 190 from the device 130. In some example embodiments, the received indication also refers to a user profile (e.g., stored by the device 130, the server machine 110, the database 115, or any suitable combination thereof) that describes the user 132 and indicates that the user 132 belongs to a particular demographic group (e.g., married men between ages 40 and 55 whose favorite ice cream flavor is vanilla).

As noted above, in operation 612, the client interface 210 updates an interaction time that corresponds to the AR object (e.g., the total interaction time 360, the demographic interaction time 362, or both). This may be performed in response to the indication received in operation 810. For example, the client interface 210 may update the total interaction time 360 that corresponds to the AR object. As another example, if the received indication in operation 810 indicates that the user 132 is a member of a particular demographic group (e.g., married women between 55 and 70 whose favorite ice cream flavor is coffee), the demographic interaction time for that particular demographic group (e.g., demographic interaction time 362) may be updated by the client interface 210. In such a situation, the total interaction time 360 may also be incremented as well (e.g., to track cumulative user interaction times from multiple demographic groups).

As noted above, in example embodiments that include operation 612, operation 620 may be performed as part of operation 420, in which the trigger condition detector 220 detects fulfillment of the trigger condition 332. In operation 620, the trigger condition detector 220 performs a comparison of the interaction time (e.g., the total interaction time 360 or the demographic interaction time 362) updated in operation 512 to a corresponding threshold interaction time (e.g., a predetermined total interaction time or a predetermined demographic interaction time, either of which may be a maximum interaction time or a minimum interaction time).

Accordingly, the detection of the fulfillment of the trigger condition 332 in operation 420 may be based on the comparison performed in operation 620. For example, if the total interaction time 360 was updated in operation 612, the trigger condition detector 220 may compare the total interaction time 360 to a reference total interaction time (e.g., a maximum interaction time for all users). As another example, if the demographic interaction time 362 was updated in operation 612, the trigger condition detector 220 may compare the demographic interaction time 362 to a reference demographic interaction time (e.g., a maximum interaction time or a minimum interaction time for that demographic group).

Figure 9:
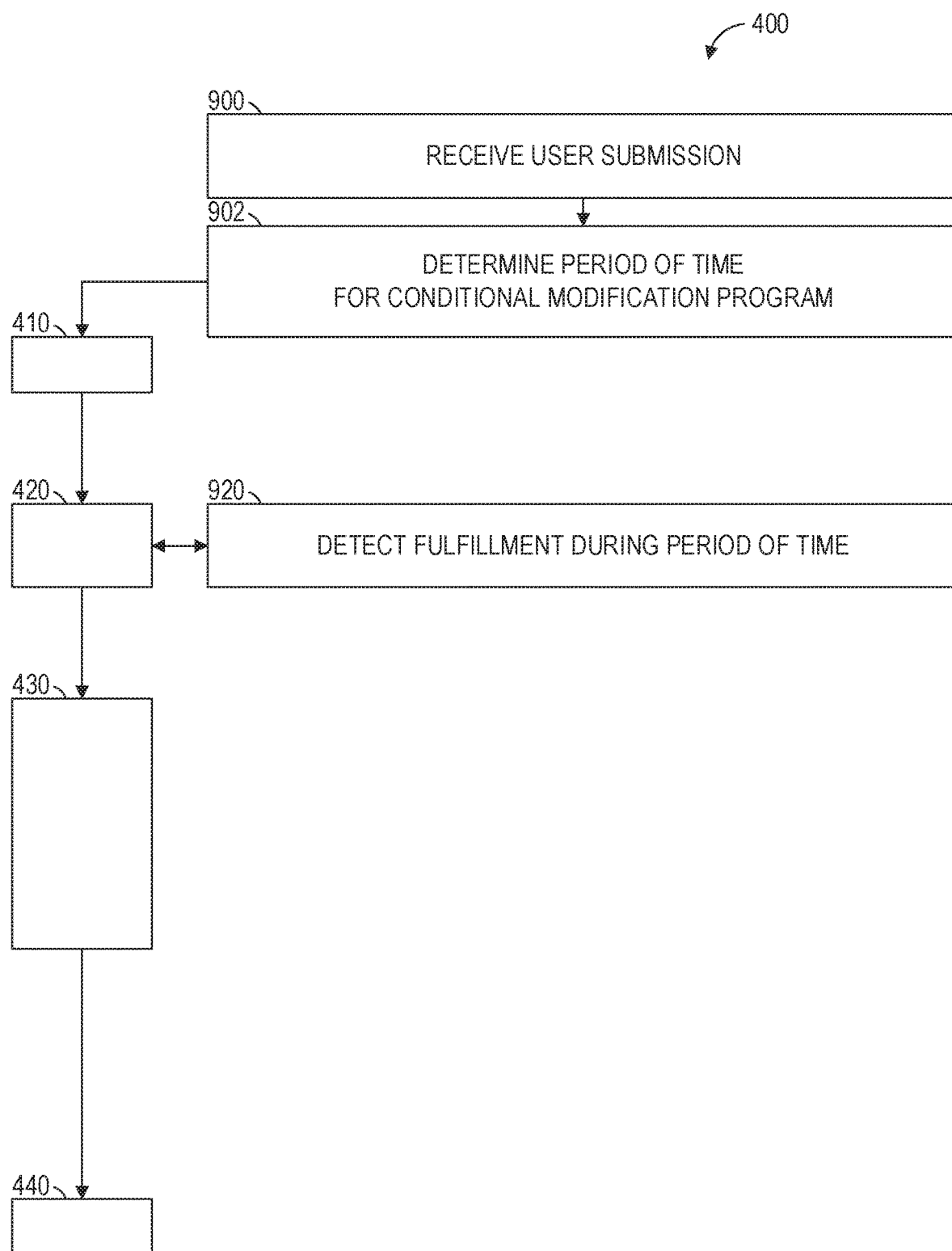

As shown in FIG. 9, in addition to any one or more of the operations previously described, the method 400 may include one or more of operations 900, 902, and 920. FIG. 9 illustrates operations 900 and 902 being performed prior to operation 410, in which the client interface 210 provides the object data 300 of the AR object to the device 130.

In operation 900, the client interface 210 receives a user submission that includes or otherwise identifies (e.g., by reference) the conditional modification program 330. That is, the conditional modification program 330 may be user-submitted (e.g., by the user 132 or by the user 152). Thus, the client interface 210 may receive the user submission (e.g., within a request or other message) via the network 190 from the device 130 or from the device 150. The user submission may also include the corresponding trigger condition 332 for execution of the conditional modification program 330. In some example embodiments, the user submission further includes a corresponding value accorded to the conditional modification program 330 (e.g., a value that indicates a bid or fee paid for incorporating the submitted conditional modification program 330 into the object data 300 of the AR object).

In operation 902, the client interface 210 determines a period of time during which the submitted conditional modification program 330 is to be specified (e.g., by inclusion or by reference) by the object data 300 that defines the AR object. In some example embodiments, this may be performed based on (e.g., in response to) the value accorded to the conditional modification program 330. For example, the user 152 may have paid a fee to have the submitted conditional modification program 330 temporarily incorporated into the object data 300 of the AR object, and this fee may be reflected in the submission received in operation 900. Accordingly, the client interface 210 may determine (e.g., via a lookup table stored by the database 115) a time period that corresponds to the amount of the fee paid, such that the client interface 210 can add the conditional modification program 330 and its trigger condition 332 to the object data 300 during the time period, and then remove the conditional modification program 330 and its trigger condition 332 from the object data 300 after expiration of the time period.

In example embodiments that include operation 902, operation 920 may be performed as part of operation 420, in which the trigger condition detector 220 to detect fulfillment of the trigger condition 332. In operation 920, the trigger condition detector 220 detects the fulfillment of the trigger condition 332 during the period of time that was determined in operation 902 for the corresponding conditional modification program 330.

According to various example embodiments, one or more of the methodologies described herein may facilitate conditional modification of an AR object. Moreover, one or more of the methodologies described herein may facilitate dynamic behavior of the AR object in response to one or more of various user interactions, cumulative user interactions, or both. In addition, one or more of the methodologies described herein are operable to improve the variety of interactive experiences provided by an AR object, including support of user-submitted conditional modification programs and corresponding trigger conditions. Hence, one or more of the methodologies described herein may facilitate provision of crowd-sourced creative experiences with one or more AR objects, as well as regularly refreshed or updated AR content that is more resistant to loss of user interest or user engagement, compared to capabilities of pre-existing systems and methods.

When these effects are considered in aggregate, one or more of the methodologies described herein may obviate a need for certain efforts or resources that otherwise would be involved in conditional modification of an AR object. Efforts expended by a user in configuring sophisticated conditional modifications to an AR object may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
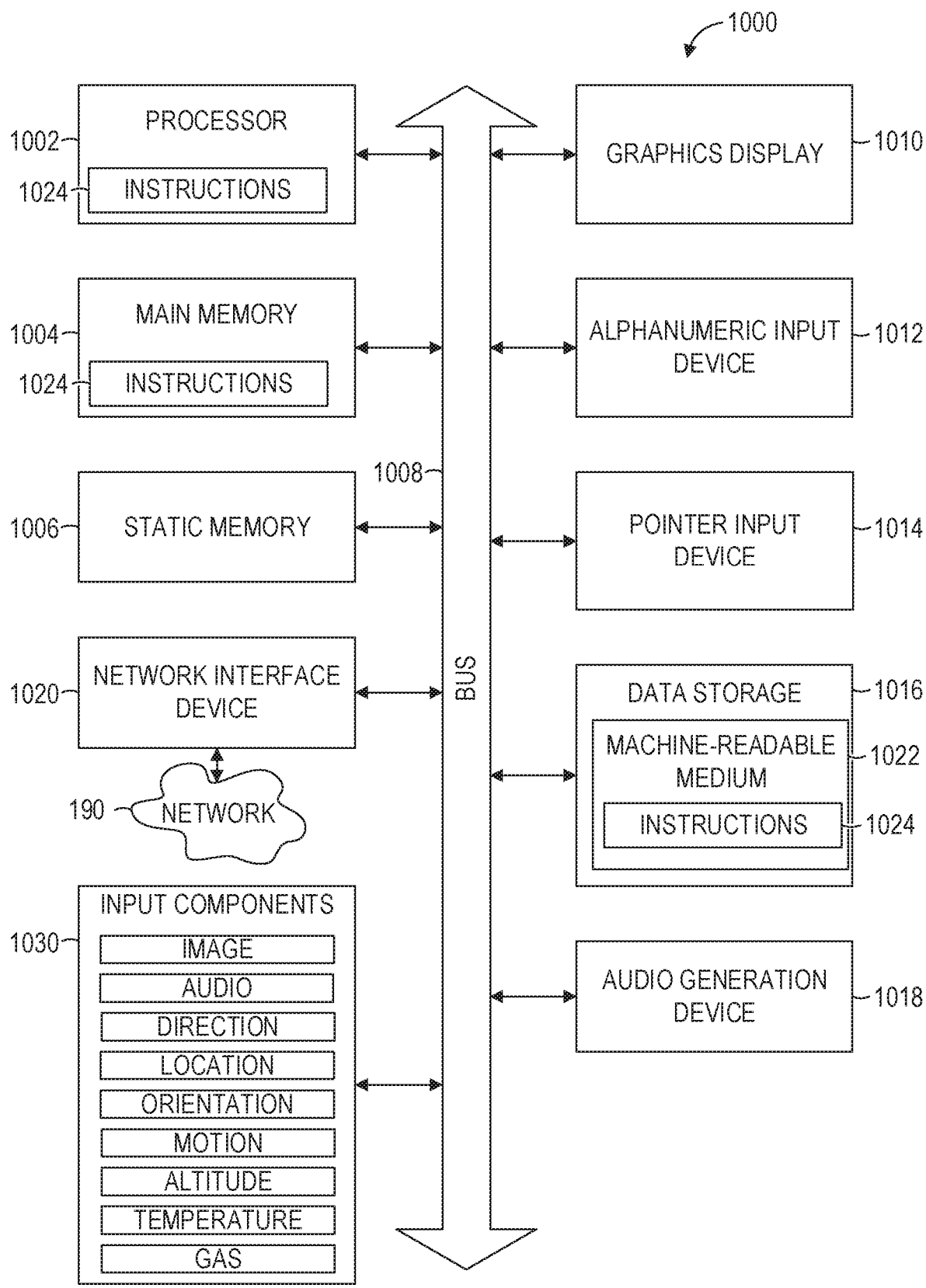
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device) and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1030 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1024 for execution by the machine 1000 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Figure 11:
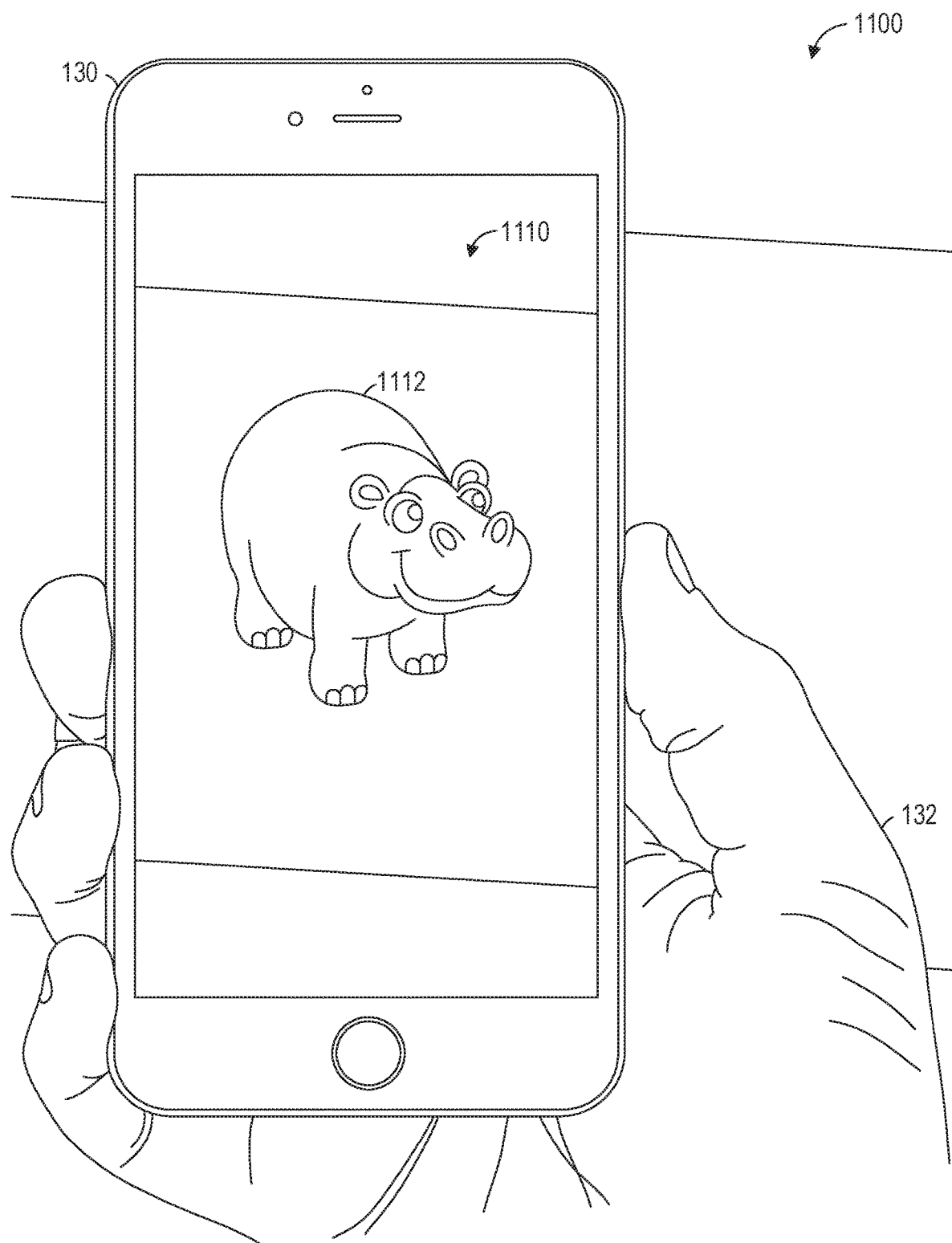
FIG. 11 and FIG. 12 are diagrams illustrating screenshots of an AR object before and after conditional modification of the AR object, according to some example embodiments.
Figure 12:
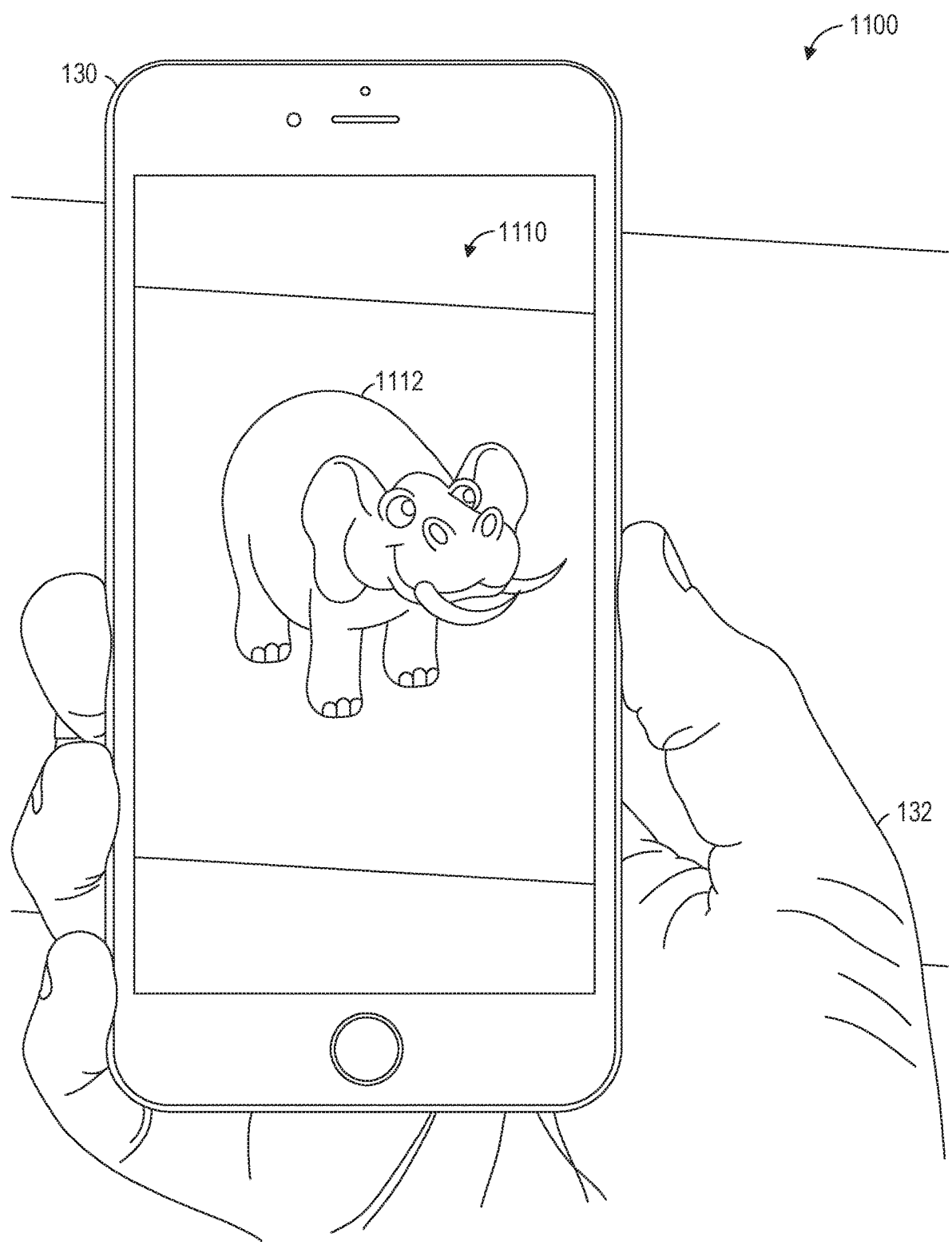

FIG. 11 and FIG. 12 are diagrams illustrating screenshots of an AR object 1112 before and after conditional modification of the AR object 1112, according to some example embodiments. As shown in FIG. 11, the device 130 is being used by the user 132 in a real-world scene 1100 and a camera of the device 130 is capturing a view of the real world scene 1100. In addition, a display screen of the device 130 depicts an AR scene 1110 that combines the real world scene 1100 with the AR object 1112. Specifically, the AR object 1112 is depicted with a pre-modification (e.g., first) appearance (e.g., a miniature hippopotamus), in accordance with its defining object data (e.g., object data 300) prior to the modification process described above.

As shown in FIG. 12, the display screen of the device 130 continues to detect the AR scene 1110, and the AR scene 1110 continues to combine the real world scene 1100 with the AR object 1112. However, the AR object 1112 is now depicted with a post-modification (e.g., second) appearance (e.g., a miniature hippopotamus with elephant ears and elephant tusks) in accordance with its defining object data (e.g., object data 300) after the modification process described above.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:
providing, to a user device and by one or more processors of a machine, object data that defines an augmented reality (AR) object, the object data of the AR object specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;
detecting, by one or more processors of the machine, fulfillment of the trigger condition specified by the object data for execution of the conditional modification program of the AR object,
based on the detected fulfillment of the trigger condition and by one or more processors of the machine, executing the conditional modification program of the AR object, the executing of the conditional modification program modifying the object data of the AR object by modifying the presentation attribute of the AR object; and providing, to the user device and by one or more processors of the machine, the modified object data of the AR object, the modified object data causing the user device to present the AR object with a second appearance based on the modified presentation attribute of the AR object.

A second example provides a method according to the first example, wherein:
the presentation attribute of the AR object specifies a physical dimension of the AR object; and
the executing of the conditional modification program modifies the physical dimension of the AR object, the second appearance of the AR object differing in size from the first appearance of the AR object.

A third example provides a method according to the first example or the second example, wherein:
the presentation attribute of the AR object specifies a color of at least a portion of the AR object; and
the executing of the conditional modification program modifies a color of the portion of the AR object, the second appearance of the AR object at least partially differing in color from the first appearance of the AR object.

A fourth example provides a method according to any of the first through third examples, wherein:
the presentation attribute of the AR object specifies the physical geolocation of the AR object; and
the executing of the conditional modification program modifies the physical geolocation of the AR object, the second appearance of the AR object differing in physical geolocation from the first appearance of the AR object.

A fifth example provides a method according to any of the first through fourth examples, further comprising:
receiving an indication that the user device submitted an edit to the AR object; and
in response to the received indication, incrementing an interaction count that corresponds to the AR object; and wherein:
the detecting of the fulfillment of the trigger condition is based on a comparison of the incremented interaction count to a threshold interaction count.

A sixth example provides a method according to any of the first through fifth examples, further comprising:
receiving an indication that the user device edited the AR object for a period of time; and
in response to the received indication, updating a total interaction time that corresponds to the AR object based on the period of time; and wherein:
the detecting of the fulfillment of the trigger condition is based on a comparison of the updated total interaction time to a threshold total interaction time.

A seventh example provides a method according to any of the first through sixth examples, further comprising:
receiving an indication that a device geolocation of the user device intersected the AR object; and
in response to the received indication, incrementing an interaction count that corresponds to the AR object; and wherein:
the detecting of the fulfillment of the trigger condition is based on a comparison of the incremented interaction count to a threshold interaction count.

An eighth example provides a method according to any of the first through seventh examples, further comprising:

receiving an indication that the user device edited the AR object and corresponds to a user profile that specifies a demographic descriptor of a user of the user device; and
in response to the received indication, incrementing an interaction count that corresponds to the AR object and corresponds to the demographic descriptor; and wherein:
the detecting of the fulfillment of the trigger condition is based on a comparison of the incremented interaction count to a threshold interaction count.

A ninth example provides a method according to any of the first through eighth examples, further comprising:
receiving an indication that the user device edited the AR object; and
in response to the received indication, incrementing an interaction count that corresponds to the AR object; and
generating a geographical map that includes a depiction of the edited AR object, the depiction having a color that indicates a frequency at which the AR object is edited.

A tenth example provides a method according to the ninth example, wherein:
the user device is a first user device; and
the method further comprises:
providing the generated geographical map to a second user device, the provided geographical map including the depiction whose color indicates the frequency at which the AR object is edited.

An eleventh example provides a method according to any of the first through tenth examples, further comprising:
receiving a user submission that includes the conditional modification program, the trigger condition for execution of the conditional modification program, and a corresponding value accorded to the conditional modification program; and
based on the value accorded to the conditional modification program, determining a period of time during which the conditional modification program is to be specified by the object data that defines the AR object; and wherein:
the detecting of the fulfillment of the trigger condition occurs within the determined period of time.

A twelfth example provides a method according to any of the first through eleventh examples, wherein:
the trigger condition for executing the conditional modification program specifies a threshold level of ambient audio loudness; and
the detecting of the fulfillment of the trigger condition includes receiving an indication that a microphone of the user device detected an actual level of ambient audio loudness that transgresses the threshold level of ambient audio loudness.

A thirteenth example provides a method according to any of the first through twelfth examples, wherein:
the trigger condition for executing the conditional modification program specifies a reference pattern of sounds; and
the detecting of the fulfillment of the trigger condition includes receiving an indication that a microphone of the user device captured the reference pattern of sounds.

A fourteenth example provides a method according to any of the first through thirteenth examples, further comprising:
receiving an indication that the user device is editing the AR object; and wherein:
the detecting of the fulfillment of the trigger condition is based on the received indication that the user device is editing the AR object; and
the executing of the conditional modification program adds an AR cursor to the second appearance of AR object, the added AR cursor indicating a location of a non-committed edit to the AR object.

A fifteenth example provides a machine-readable medium (e.g., a non-transitory machine-readable storage medium) comprising instructions that, when executed by one or more processors of a machine, cause the machine to perform operations comprising:
providing, to a user device, object data that defines an augmented reality (AR) object, the object data of the AR object specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;
detecting, by one or more processors of the machine, fulfillment of the trigger condition specified by the object data for execution of the conditional modification program of the AR object;
based on the detected fulfillment of the trigger condition, executing the conditional modification program of the AR object, the executing of the conditional modification program modifying the object data of the AR object by modifying the presentation attribute of the AR object; and
providing, to the user device, the modified object data of the AR object, the modified object data causing the user device to present the AR object with a second appearance based on the modified presentation attribute of the AR object.

A sixteenth example provides a machine-readable medium according to the fifteenth example, wherein the operations further comprise:
receiving an indication that the user device submitted an edit to the AR object; and
in response to the received indication, incrementing an interaction count that corresponds to the AR object; and wherein:
the detecting of the fulfillment of the trigger condition is based on a comparison of the incremented interaction count to a threshold interaction count.

A seventeenth example provides a machine-readable medium according to the fifteenth example or the sixteenth example, wherein the operations further comprise:
receiving an indication that a device geolocation of the user device intersected the AR object; and
in response to the received indication, incrementing an interaction count that corresponds to the AR object; and wherein:
the detecting of the fulfillment of the trigger condition is based on a comparison of the incremented interaction count to a threshold interaction count.

An eighteenth example provides a system comprising:
one or more processors; and
a memory storing instructions that, when executed by at least one processor among the one or more processors, cause the system to perform operations comprising:
providing, to a user device, object data that defines an augmented reality (AR) object, the object data of the AR object specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;
detecting, by one or more processors of the machine, fulfillment of the trigger condition specified by the object data for execution of the conditional modification program of the AR object;
based on the detected fulfillment of the trigger condition, executing the conditional modification program of the AR object, the executing of the conditional modification program modifying the object data of the AR object by modifying the presentation attribute of the AR object; and
providing, to the user device, the modified object data of the AR object, the modified object data causing the user device to present the AR object with a second appearance based on the modified presentation attribute of the AR object.

A nineteenth example provides a system according to the eighteenth example, wherein the operations further comprise:
receiving an indication that the user device edited the AR object for a period of time; and
in response to the received indication, updating a total interaction time that corresponds to the AR object based on the period of time; and wherein:
the detecting of the fulfillment of the trigger condition is based on a comparison of the updated total interaction time to a threshold total interaction time.

A twentieth example provides a system according to the eighteenth example or the nineteenth example, wherein the operations further comprise:
receiving an indication that the user device edited the AR object; and
in response to the received indication, incrementing an interaction count that corresponds to the AR object; and
generating a geographical map that includes a depiction of the edited AR object, the depiction having a color that indicates a frequency at which the AR object is edited.

A twenty-first example provides a carrier medium carrying machine-readable instructions for controlling a machine to carry out the operations (e.g., method operations) performed in any one of the previously described examples.

What is claimed is:
1. A method comprising:
providing, to a user device and by one or more processors, object data that defines an augmented reality (AR) object, the object data specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;
receiving, by the one or more processors, an indication that the AR object is being edited via the user device;
detecting, by the one or more processors, fulfillment of the trigger condition specified by the object data, the detecting being based on the received indication that the user device is editing the AR object;
based on the detected fulfillment of the trigger condition and by the one or more processors, executing the conditional modification program, the executed conditional modification program modifying the object data of the AR object by modifying the presentation attribute of the AR object, the modified presentation attribute adding an AR indicator to the second appearance of AR object, the added AR indicator indicating a location of a non-committed edit to the AR object; and
providing, to the user device and by the one or more processors, the modified object data of the AR object, the modified object data causing the user device to present the AR object with a second appearance based on the modified presentation attribute.

2. The method of claim 1, wherein:
the presentation attribute of the AR object specifies a physical dimension of the AR object; and
the executing of the conditional modification program modifies the physical dimension of the AR object, the second appearance of the AR object differing in size from the first appearance of the AR object.

3. The method of claim 1, wherein:
the presentation attribute of the AR object specifies a color of at least a portion of the AR object; and
the executing of the conditional modification program modifies the color of the portion of the AR object, the second appearance of the AR object at least partially differing in color from the first appearance of the AR object.

4. The method of claim 1, wherein:
the presentation attribute of the AR object specifies the physical geolocation of the AR object; and
the executing of the conditional modification program modifies the physical geolocation of the AR object, the second appearance of the AR object differing in physical geolocation from the first appearance of the AR object.

5. The method of claim 1, further comprising:
receiving an indication that the user device submitted an edit to the AR object; and
in response to the received indication, incrementing an interaction count that corresponds to the AR object; and wherein:
the detecting of the fulfillment of the trigger condition is based on a comparison of the incremented interaction count to a threshold interaction count.

6. The method of claim 1, further comprising:
receiving an indication that the user device edited the AR object for a period of time; and
in response to the received indication, updating a total interaction time that corresponds to the AR object based on the period of time; and wherein:
the detecting of the fulfillment of the trigger condition is based on a comparison of the updated total interaction time to a threshold total interaction time.

7. The method of claim 1, further comprising:
receiving an indication that a device geolocation of the user device intersected the AR object; and
in response to the received indication, incrementing an interaction count that corresponds to the AR object; and wherein:
the detecting of the fulfillment of the trigger condition is based on a comparison of the incremented interaction count to a threshold interaction count.

8. The method of claim 1, further comprising:
receiving an indication that the user device edited the AR object and corresponds to a user profile that specifies a demographic descriptor of a user of the user device; and
in response to the received indication, incrementing an interaction count that corresponds to the AR object and corresponds to the demographic descriptor; and wherein:
the detecting of the fulfillment of the trigger condition is based on a comparison of the incremented interaction count to a threshold interaction count.

9. The method of claim 1, further comprising:
receiving an indication that the user device edited the AR object;
in response to the received indication, incrementing an interaction count that corresponds to the AR object; and generating a geographical map that includes a depiction of the edited AR object, the depiction having a color that indicates a frequency at which the AR object is edited.

10. The method of claim 9, wherein:
the user device is a first user device; and
the method further comprises:
providing the generated geographical map to a second user device, the provided geographical map including the depiction whose color indicates the frequency at which the AR object is edited.

11. The method of claim 1, further comprising:
receiving a user submission that includes the conditional modification program, the trigger condition for execution of the conditional modification program, and a corresponding value accorded to the conditional modification program; and
based on the value accorded to the conditional modification program, determining a period of time during which the conditional modification program is to be specified by the object data that defines the AR object, and wherein:
the detecting of the fulfillment of the trigger condition occurs within the determined period of time.

12. The method of claim 1, wherein:
the trigger condition for executing the conditional modification program specifies a threshold level of ambient audio loudness; and
the detecting of the fulfillment of the trigger condition includes receiving an indication that a microphone of the user device detected an actual level of ambient audio loudness that transgresses the threshold level of ambient audio loudness.

13. The method of claim 1, wherein:
the trigger condition for executing the conditional modification program specifies a reference pattern of sounds; and
the detecting of the fulfillment of the trigger condition includes receiving an indication that a microphone of the user device captured the reference pattern of sounds.

14. A non-transitory machine-readable storage medium comprising instructions that, when executed by one or more processors of a machine, cause the machine to perform operations comprising:
providing, to a user device, object data that defines an augmented reality (AR) object, the object data specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;
receiving an indication that the AR object is being edited via the user device;
detecting fulfillment of the trigger condition specified by the object data, the detecting being based on the received indication that the user device is editing the AR object;
based on the detected fulfillment of the trigger condition, executing the conditional modification program, the executed conditional modification program modifying the object data of the AR object by modifying the presentation attribute of the AR object, the modified presentation attribute adding an AR indicator to the second appearance of AR object, the added AR indicator indicating a location of a non-committed edit to the AR object; and providing, to the user device, the modified object data of the AR object, the modified object data causing the user device to present the AR object with a second appearance based on the modified presentation attribute.

15. The non-transitory machine-readable storage medium of claim 14, wherein the operations further comprise:

receiving an indication that the user device submitted an edit to the AR object; and in response to the received indication, incrementing an interaction count that corresponds to the AR object; and wherein:

the detecting of the fulfillment of the trigger condition is based on a comparison of the incremented interaction count to a threshold interaction count.

16. The non-transitory machine-readable storage medium of claim 14, wherein:

receiving an indication that a device geolocation of the user device intersected the AR object; and in response to the received indication, incrementing an interaction count that corresponds to the AR object; and wherein:

the detecting of the fulfillment of the trigger condition is based on a comparison of the incremented interaction count to a threshold interaction count.

17. The non-transitory machine-readable storage medium of claim 14, wherein the operations further comprise:

receiving a user submission that includes the conditional modification program, the trigger condition for execution of the conditional modification program, and a corresponding value accorded to the conditional modification program; and based on the value accorded to the conditional modification program, determining a period of time during which the conditional modification program is to be specified by the object data that defines the AR object, and wherein:

the detecting of the fulfillment of the trigger condition occurs within the determined period of time.

18. A system comprising:

one or more processors; and a memory storing instructions that, when executed by at least one processor among the one or more processors, cause the system to perform operations comprising:

providing, to a user device, object data that defines an augmented reality (AR) object, the object data specifying a physical geolocation of the AR object, a presentation attribute of the AR object, a conditional modification program of the AR object, and a trigger condition for execution of the conditional modification program, the provided object data causing the user device to present the AR object with a first appearance and located at the physical geolocation;

receiving an indication that the AR object is being edited via the user device;

detecting fulfillment of the trigger condition specified by the object data, the detecting being based on the received indication that the user device is editing the AR object;

based on the detected fulfillment of the trigger condition, executing the conditional modification program, the executed conditional modification program modifying the object data of the AR object by modifying the presentation attribute of the AR object, the modified presentation attribute adding an AR indicator to the second appearance of AR object, the added AR indicator indicating a location of a non-committed edit to the AR object; and providing, to the user device, the modified object data of the AR object, the modified object data causing the user device to present the AR object with a second appearance based on the modified presentation attribute.

19. The system of claim 18, wherein the operations further comprise:

receiving an indication that the user device edited the AR object for a period of time; and in response to the received indication, updating a total interaction time that corresponds to the AR object based on the period of time; and wherein:

the detecting of the fulfillment of the trigger condition is based on a comparison of the updated total interaction time to a threshold total interaction time.

20. The system of claim 18, wherein the operations further comprise:

receiving an indication that the user device edited the AR object;

in response to the received indication, incrementing an interaction count that corresponds to the AR object; and generating a geographical map that includes a depiction of the edited AR object, the depiction having a color that indicates a frequency at which the AR object is edited.

* * * * *